Figure 1:
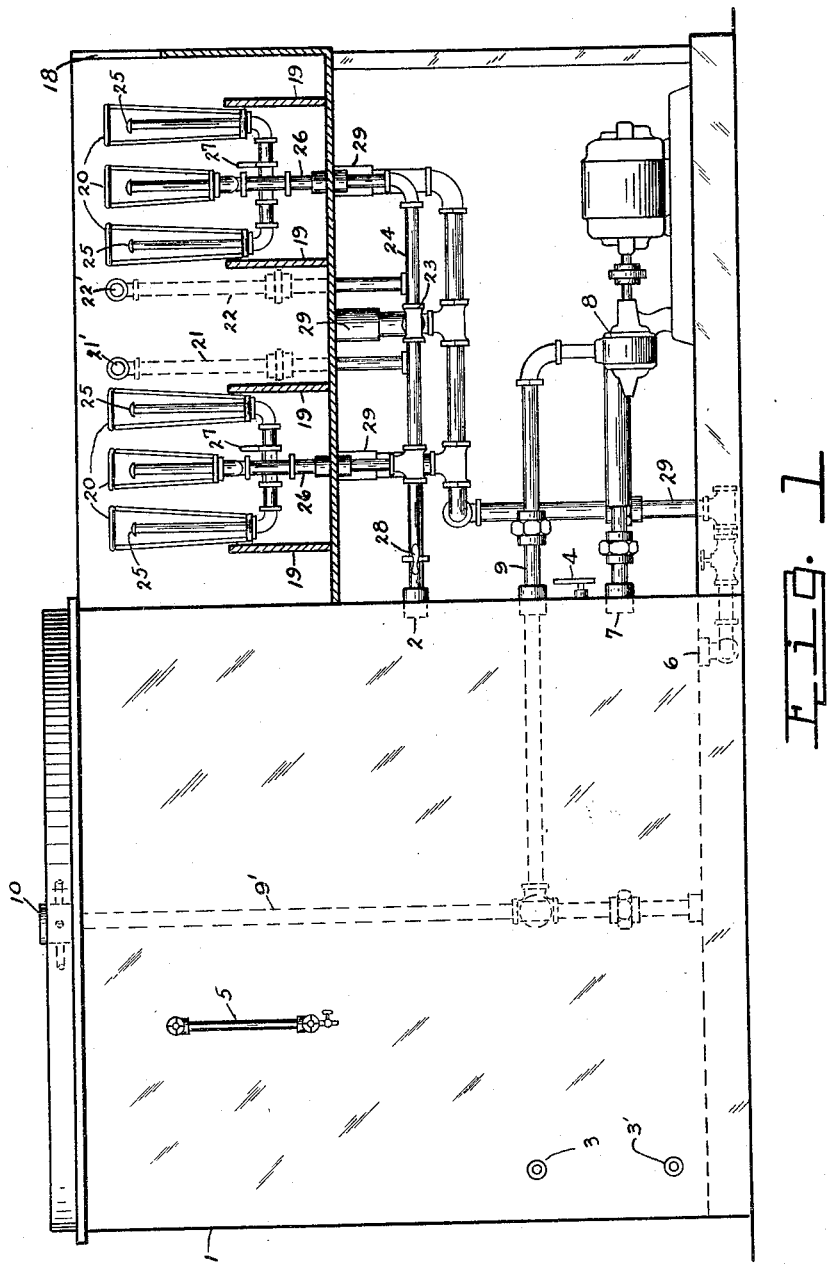

June 7, 1932. J. S. HERRMANN 1,862,307
BOTTLE WASHING MACHINE
Filed Jan. 20, 1931 2 Sheets-Sheet 1

Inventor
John S. Herrmann
By John J. Riley
Attorney

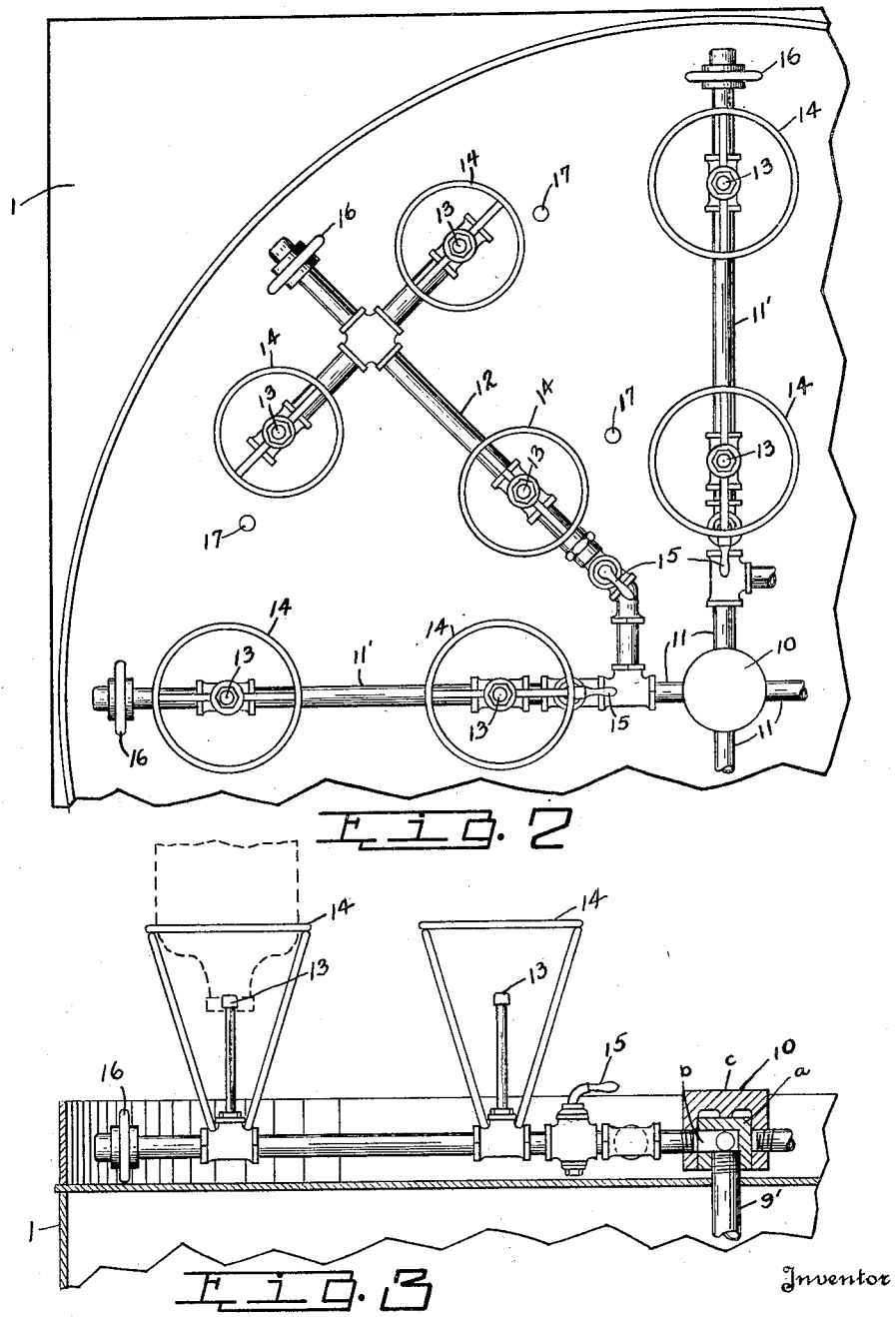

Patented June 7, 1932

1,862,307

UNITED STATES PATENT OFFICE

JOHN S. HERRMANN, OF SHARON, PENNSYLVANIA

BOTTLE WASHING MACHINE

Application filed January 20, 1931. Serial No. 510,045.

The purpose of my invention is to provide a compact device for sterilizing and washing bottles of different sizes, particularly large bottles such as those used for distributing spring water, and including means for heating the sterilizing medium, providing for the re-use of such medium, and for the rinsing of the bottles after they have been sterilized.

My device comprises a solution tank, means for heating the solution in said tank, a bottle rack or conveyor rotatable upon an axis, means for internally spraying with heated solution the bottles on said conveyor, means for controlling said spraying device, and means for external cleansing and internal rinsing of said bottles upon their removal from the conveyor. The details of my device are explained as follows, reference being made to the accompanying drawings:

Figure 1 is a front view of the complete bottle washing machine, excepting the conveyor and spraying mechanism which is shown in Figure 2. Figure 2 is a fragmentary top plan view of the solution tank 1 (Figure 1), showing the bottle conveyor and spraying mechanism. Figure 3 is a sectional view of the valve 10 (Fig. 1 and Fig. 2), showing the details of its construction and its relation to the connecting sprayer lines.

In Fig. 1, the tank 1 is of metal or other suitable material, with inlet pipe 2 for delivering fresh water thereto. By the couplings 3, 3' the tank may be connected with an ordinary gas, oil, or kerosene heated external coil, or a coil placed inside said tank may be connected to an external steam heating system, as a means of heating the contents of the tank. Secured to the tank is a thermometer 4 to indicate the temperature of the solution in the tank, the gauge 5 to indicate the height of said solution, and an outlet 6 to the sewer.

Another outlet pipe is connected with the pump 8, whereby the solution is forced from the tank through pipe 9—9' into the valve 10, distributing said solution to the spraying nozzles comprised in the conveyor-sprayer system.

The tank 1 is fitted with an opening in the top thereof, with a cover for said opening, whereby access may be had to the interior of the tank.

An aperture in the cover of said tank allows the vertical pipe 9' to protrude above the surface thereof for connection with the valve 10.

The solution from the tank and vertical pipe 9' (Fig. 1) flows through the valve 10, fitted on said vertical pipe protruding from the solution tank, into sprayer units 11 extending therefrom. Each of the sprayer units comprises a main arm 11' and one or more adjoining arms 12. On each of said arms is fitted a series of upright spraying nozzles 13, racks 14 to hold the bottles over said nozzles, and a cock 15 by which the flow of solution through said nozzles may be regulated. A wheel or roller 16 is also secured at the terminus of each spraying arm 11', 12 to bear the weight of said arm and the bottles resting on it as it rotates with the valve 10.

Apertures 17 in the top of the solution tank provide a means whereby solution draining from the bottles to the top of the solution tank may return to the interior of the tank where it is again heated and used.

It will be noted that the bottle racks 14 on the sprayer arms are of different sizes, which enables the washing of bottles of various sizes, and may be arranged to suit the needs of the user and to obtain a more compact arrangement of the different sized bottles being washed by the machine.

The drawing (Fig. 2) also shows four main sprayer units connected with the valve 10, but it would be within the scope of my invention to increase the number of such lines, proper adjustment being made to said valve, which will now be explained.

The valve plug $a$ is threaded or otherwise fitted on the vertical pipe 9' protruding from the solution tank. Said valve plug has a circumferential slot $b$ therein extending around a predetermined portion of its circumference, depending upon the number of connecting sprayer lines that it is desired to have operating concurrently. In the drawings I have shown the slot extending around three-fourths of the circumference so that three of the lines of the sprayer mechanism can be operated at the same time, one line remaining dry. The valve plug is so fixed on the pipe 9' that the dry line is always in front of the operator.

Over the valve plug *a* is fitted the combination valve casing and hub *c* of the spraying mechanism, with lateral ports therein, being rotatable upon the valve plug *a*. The rotation of the spraying mechanism results in the closing of each sprayer line as it and its connecting port in the valve casing is brought opposite the closed portion of the valve plug, the other lines remaining in operation and spraying the bottles on them. As previously explained, the operation of the spraying mechanism may be further regulated by the shut-off cock 15 on each sprayer arm.

Referring further to Fig. 1, secured to said solution tank 1 is the rinse tank 18, with open top and front slightly lower than the back. Within the tank are two series of low walls 19 extending forwardly from the back wall of the rinse tank 18, each series connected by a front wall spaced from the front wall of the tank 18 to form two receiving basins for the rinse water draining from the bottles being rinsed on the racks 20, which may be similar in construction to the racks 14 (Fig. 1) or may have their bases extended to and welded to the bottom of the tank. Said basins formed by the walls 19 serve to separate such rinse drainage from the solution in the surrounding portion of the tank, used for washing manually the exterior of the bottles.

The tank proper is supplied with hot and cold water by separate pipes 21, 22 and faucets 21', 22', said pipes being connected with the main hot and cold water supply lines at their bases. Between said separate connections of the hot and cold water supply lines with said pipes 21, 22 and the tee 23 on pipe 24, the hot and cold water supply lines are joined and enter said pipe 24 by means of the tee 23, a control cock being placed upon each of said lines adjacent to their union so that the hot and cold water being supplied to pipe line 24 may be regulated.

The rinsing sprayers 25 are connected with the pipe line 24 by pipes 26, upon each of which is placed a control cock 27 before its connection with the three sprayer lines comprising each of the two rinser units.

By means of the cocks on each of the main hot and cold water supply lines, hereinbefore referred to, the water in pipe line 24 leading to the sprayers and the solution tank at cock 28 and inlet 2 may be tempered to varying degrees of temperature. This facilitates the furnishing of hot water to the solution tank, and also of tempered water to the sprayers to prevent breakage of bottles after the heat of the sterilizing process.

The water for the rinse spray may also be further tempered, or independently tempered, by first running it through a coil within the solution tank before it reaches the rinsing sprayers, if it is so desired.

Drains 29 to the sewer from each compartment of the rinse tank are also provided.

Having thus described my invention, I claim:

1. In a bottle washing machine, the combination of a liquid tank, a rotary valve mounted on top thereof comprising a valve casing rotatably mounted on a stationary valve plug, said plug having a port, lateral ports in said valve casing adapted to be placed successively in communication with the first named port upon rotation of the valve casing, means for forcing liquid from said tank through said valve, sprayer supply pipes laterally connected to said ports in said valve casing, cocks placed on and regulating the flow of liquid through each of said sprayer supply pipes, a plurality of spray nozzles connected to said sprayer supply pipes, and means for holding bottles over said spray nozzles.

2. In a bottle washing machine, the combination of a liquid tank, a rotary valve mounted on top thereof comprising a valve casing rotatably mounted on a stationary valve plug, said plug having a port, lateral ports in said valve casing adapted to be placed successively in communication with the first named port upon rotation of the valve casing, means for forcing liquid from said tank through said valve, main sprayer supply pipes laterally connected to said ports in said valve casing, branch sprayer supply pipes connected to said main sprayer supply pipes and extending therefrom, cocks placed on and regulating the flow of liquid through each of said main and branch sprayer supply pipes, a plurality of spray nozzles connected to said sprayer supply pipes, and means for holding bottles over said spray nozzles.

3. In a bottle washing machine, the combination of a liquid tank, a rotary valve mounted on top thereof comprising a valve casing rotatably mounted on a stationary valve plug, said plug having a port, lateral ports in said valve casing adapted to be placed successively in communication with the first named port upon rotation of the valve casing, means for forcing liquid from said tank through said valve, sprayer supply pipes laterally connected to said ports in said valve casing, cocks placed on and regulating the flow of liquid through each of said sprayer supply pipes, a plurality of spray nozzles connected to said sprayer supply pipes, and means for holding bottles over said spray nozzles, the top of said tank having a plurality of apertures therein spaced throughout the drainage area.

4. In a bottle washing machine, the combination of a liquid tank, a rotary valve mounted on top thereof comprising a valve casing rotatably mounted on a stationary valve plug, said plug having a port, lateral ports in said valve casing adapted to be placed successively in communication with said first named port upon rotation of the valve casing, means for forcing liquid from said tank through said valve, main sprayer supply pipes laterally connected to said ports in said valve casing, branch sprayer supply pipes connected to said main sprayer supply pipes and extending therefrom, cocks placed on and regulating the flow of liquid through each of said main and branch sprayer supply pipes, a plurality of spray nozzles connected to said sprayer supply pipes, and means for holding bottles over said spray nozzles, the top of said tank having a plurality of apertures therein spaced throughout the drainage area.

JOHN S. HERRMANN.